(12) United States Patent
Huang et al.

(10) Patent No.: US 11,652,552 B2
(45) Date of Patent: May 16, 2023

(54) INDOOR DISASTER LOCALIZATION VIA HYBRID ETHERNET/OPTICAL FIBER CABLE

(71) Applicant: NEC Laboratories America, Inc., Princeton, NJ (US)

(72) Inventors: Ming-Fang Huang, Princeton, NJ (US); Ting Wang, West Windsor, NJ (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 17/147,379

(22) Filed: Jan. 12, 2021

(65) Prior Publication Data

US 2021/0258074 A1   Aug. 19, 2021

Related U.S. Application Data

(60) Provisional application No. 62/960,247, filed on Jan. 13, 2020.

(51) Int. Cl.
| | |
|---|---|
| *H04B 10/25* | (2013.01) |
| *H04W 84/18* | (2009.01) |
| *H04L 67/12* | (2022.01) |
| *H04W 4/90* | (2018.01) |
| *H04W 4/02* | (2018.01) |

(52) U.S. Cl.
CPC ............ *H04B 10/25* (2013.01); *H04L 67/12* (2013.01); *H04W 4/023* (2013.01); *H04W 4/90* (2018.02); *H04W 84/18* (2013.01)

(58) Field of Classification Search
CPC ........ H04B 10/25; H04W 4/90; H04W 4/023; H04W 84/18; H04L 67/12
USPC .......................................................... 398/13
See application file for complete search history.

(56) References Cited

U.S. PATENT DOCUMENTS

| | | | |
|---|---|---|---|
| 8,661,907 B2 * | 3/2014 | Davis ................. | G01D 5/35383 |
| | | | 73/643 |
| 10,388,434 B1 * | 8/2019 | Gebs ...................... | H01B 11/06 |
| 2006/0018586 A1 * | 1/2006 | Kishida .............. | G01D 5/35383 |
| | | | 374/E11.015 |
| 2007/0012112 A1 * | 1/2007 | Kim ....................... | G01H 9/004 |
| | | | 73/594 |
| 2012/0127459 A1 * | 5/2012 | Handerek .............. | G01D 5/353 |
| | | | 356/73.1 |
| 2018/0332371 A1 * | 11/2018 | Suzuki ................... | H04B 10/25 |
| 2019/0003879 A1 * | 1/2019 | Bao ......................... | G02B 6/02 |
| 2019/0025094 A1 * | 1/2019 | Lewis ................. | G01D 5/35361 |
| 2019/0124425 A1 * | 4/2019 | Elford ................ | H04Q 11/0067 |
| 2020/0007228 A1 * | 1/2020 | Hu ..................... | G01D 5/35364 |
| 2020/0124489 A1 * | 4/2020 | Godfrey ............. | G01D 5/35361 |

* cited by examiner

*Primary Examiner* — Dalzid E Singh
(74) *Attorney, Agent, or Firm* — Joseph Kolodka

(57) ABSTRACT

Aspects of the present disclosure describe systems, methods and structures providing detection and localization of disaster-related indoor events via hybrid ethernet/optical fiber cable.

6 Claims, 4 Drawing Sheets

INDOOR DISASTER LOCALIZATION VIA HYBRID ETHERNET/OPTICAL FIBER CABLE

CROSS REFERENCE

This disclosure claims the benefit of U.S. Provisional Patent Application Ser. No. 62/960,247 filed Jan. 13, 2020 the entire contents of which is incorporated by reference as if set forth at length herein.

TECHNICAL FIELD

This disclosure relates generally to disaster localization. More particularly, it describes indoor disaster localization via hybrid ethernet/optical fiber cable.

BACKGROUND

As can be readily understood and appreciated, disaster recognition/localization and possible subsequent emergency rescue is of considerable—and increasing concern in contemporary society. Particularly in public places such as schools, the ability to detect and localize such disasters as early as possible is critically important to minimize harm and/or casualties.

Given this importance, systems, methods, and structures that facilitate real-time detection/localization of disasters would represent a welcome addition to the art.

SUMMARY

An advance in the art is made according to aspects of the present disclosure directed to real-time disaster detection/localization via hybrid Ethernet/optical fiber cable(s).

BRIEF DESCRIPTION OF THE DRAWING

A more complete understanding of the present disclosure may be realized by reference to the accompanying drawing in which:

FIG. 3(A) distributed sensing elements and FIG. 3(B) distributed sensing network according to aspects of the present disclosure; FIG. 4(A) distributed sensing elements and FIG. 4(B) distributed sensing network in a tree topology according to aspects of the present disclosure.

Figure 1:
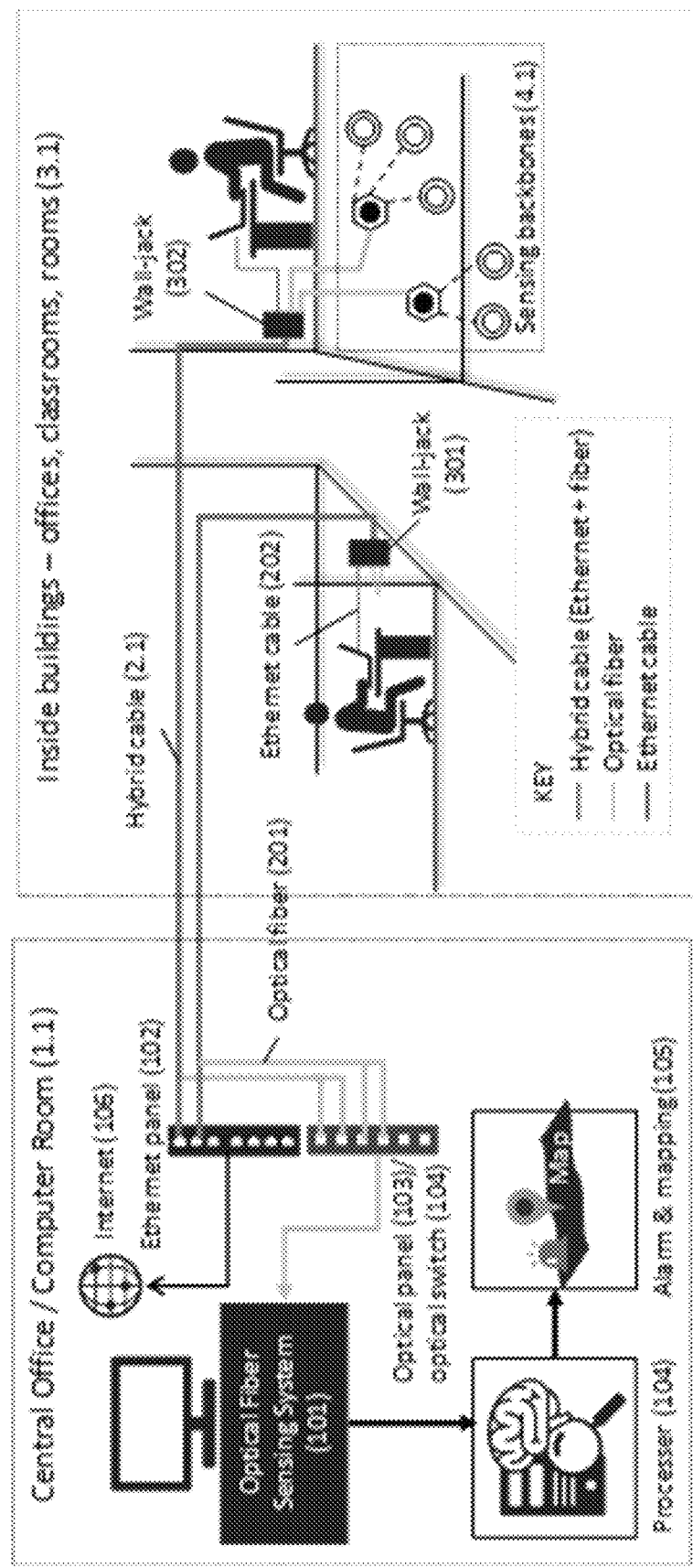
FIG. 1 is a schematic diagram illustrating a disaster detection/localization architecture using hybrid Ethernet/optical fiber cable as sensing medium according to aspects of the present disclosure.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we begin by noting that distributed optical fiber sensing (DOFS) is an important and widely used technology to detect environmental conditions (such as temperature, vibration, stretch level etc.) anywhere along an optical fiber cable that in turn is connected to an interrogator. As is known, contemporary interrogators are systems that generates an input signal to the fiber, detects and analyzes the reflected/scattered and subsequently received signal. The signals are analyzed, and an output is generated which is indicative of the environmental conditions encountered along the length of the fiber. The signal(s) so received may result from reflections in the fiber, such as Raman backscattering, Rayleigh backscattering, and Brillion backscattering. It can also be signal of forward direction that uses the speed difference of multiple modes. Without losing generality, the following description assumes reflected signal though the same approaches can be applied to forwarded signal as well.

As will be appreciated, a contemporary DOFS system includes an interrogator that periodically generates optical pulses (or any coded signal) and injects them into an optical fiber. The injected optical pulse signal is conveyed along the optical fiber.

At locations along the length of the fiber, a small portion of signal is reflected and conveyed back to the interrogator. The reflected signal carries information the interrogator uses to detect, such as a power level change that indicates—for example—a mechanical vibration.

The reflected signal is converted to electrical domain and processed inside the interrogator. Based on the pulse injection time and the time signal is detected, the interrogator determines at which location along the fiber the signal is coming from, thus able to sense the activity of each location along the fiber.

FIG. 1 is a schematic diagram illustrating a disaster detection/localization architecture using hybrid Ethernet/optical fiber cable as sensing medium according to aspects of the present disclosure. As is apparent, the architecture advantageously may employ contemporary data-communications (i.e., Ethernet) cable typically found in many commercial/residential buildings/homes etc. While such Ethernet has generally undergone many iterations and improvements, it describes a family of wired computer networking technologies used in local area networks (LAN), metropolitan area networks (MAN), and wide area networks (WAN). While the iterations have been refined to support higher bit rates, a greater number of nodes and longer link distances, much backward compatibility has been maintained. Original Ethernet implementations employed coaxial cable as a shared medium, newer Ethernet variants employ twisted pair and fiber optical cables in conjunction with switches.

With continued reference to that figure, we note that such cables employed generally interconnect buildings including offices, to a central office/computer rooms. According to an aspect of the present disclosure, such hybrid cables include one or more optical fibers (for sensing and/or communications) along with contemporary Ethernet (CAT 6, CAT 5e, etc) cables (for communications). As those skilled in the art will understand and appreciate, such hybrid cables advantageously permit the simultaneous optical sensing and data service/communications.

Such architecture generally includes a control/monitoring/central office/computer room/facility room that is interconnected via the hybrid cable to spaces located inside buildings including—for example—offices, classrooms, other rooms. In this manner a sensing "backbone" is provided along with the data communications backbone that is distributed in any of a variety of known arrangements. Not specifically shown, but as will be understood by those skilled in the art, Ethernet segments may be supplemented by wireless methodologies including WiFI. Within the central office/computer room, an optical fiber sensing system—including interrogator described previously—is interconnected to the building and sensing via the hybrid cable using—for example—switching equipment and/or panels. Processing and/or alarm and mapping functions/systems may advantageously interpret the sensory data and provide location and/or mapping information to responders.

Of course, such control/monitoring may be located in a public police/fire/response organization which in turn may be many kilometers from the areas/buildings being monitored/serviced.

Shown further in the figure are a pair of switches/panels in the control/monitoring room, namely an Ethernet panel/switch to service data services via the Ethernet cables and the optical panel/switch which services sensing (DFOS) signals. Further interconnection to other networks including an Internet may be provided via these or other network interconnects.

In a preferred embodiment, a processor including an optional AI analyzer may review sensory data and determine the existence and location of sensed events and providing any alarm and/or mapping information to appropriate personnel including first responders.

Since the sensing cable is shown positioned throughout the buildings including offices, classrooms, other rooms, etc., the sensing functions can advantageously monitor the entire building by a single sensing system—either co-located or remotely located—as appropriate. Furthermore, such sensing system may advantageously monitor multiple buildings. Inside an office, a wall jack—for example—may be employed that includes both Ethernet ports and fiber ports that provide both data service to computers and optical ports to sensing backbones deployed throughout the office space.

While not specifically shown, such installations advantageously "future-proof" the infrastructure as the optical fiber that comprise the hybrid cable may advantageously be simultaneously used for sensing and/or communications.

Figure 2:
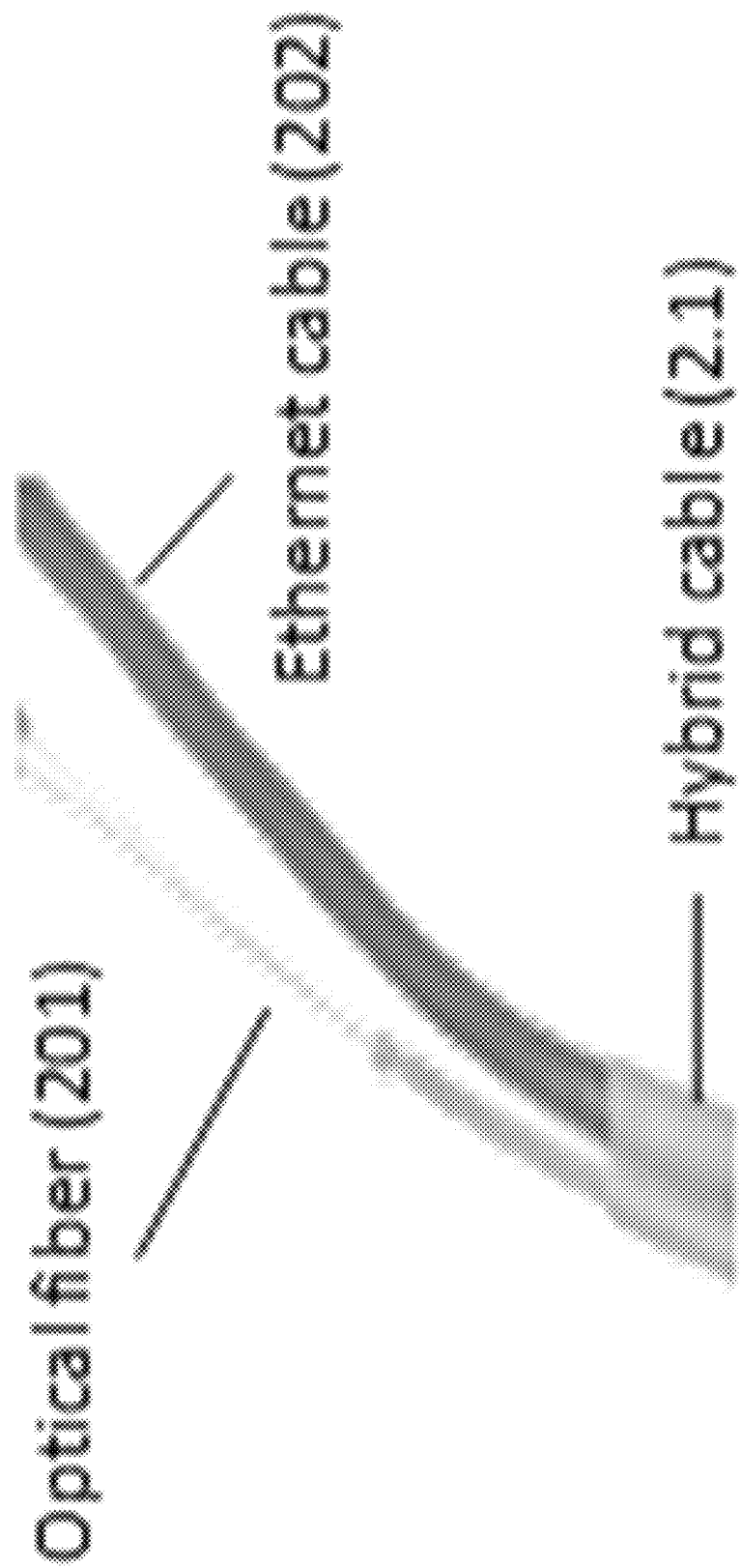
FIG. 2 is a schematic diagram of an illustrative hybrid cable according to aspects of the present disclosure.

FIG. 2 is a schematic diagram of an illustrative hybrid cable according to aspects of the present disclosure. As may be observed, such hybrid cable includes—at a minimum—an Ethernet cable and an optical fiber cable. Additional cables, i.e., coaxial, may also be included in the hybrid cable composite bundle as application needs dictate.

Of further advantage, at least two network architectures may be employed according to aspects of the present disclosure as indoor distributed networks and indoor tree networks.

Figure 3A:
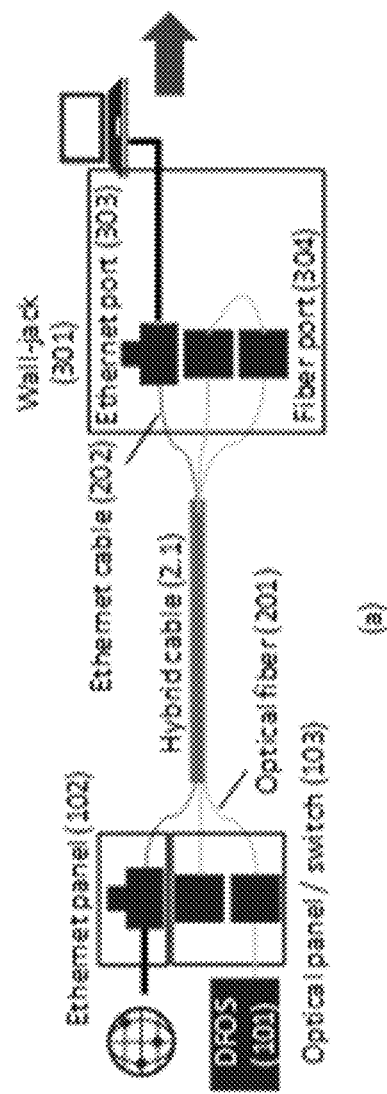
FIG. 3(A) and FIG. 3(B) are a schematic diagrams illustrating.
Figure 3B:
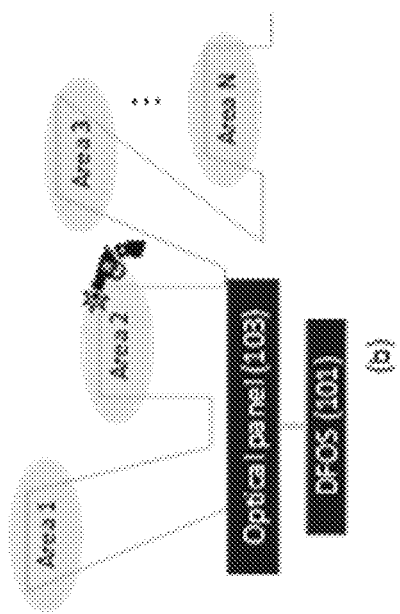

FIG. 3(A) and FIG. 3(B) are a schematic diagrams illustrating indoor distributed networks wherein: FIG. 3(A) distributed sensing elements and FIG. 3(B) distributed sensing network according to aspects of the present disclosure.

As shown therein, two optical fiber ports are disposed on wall jack and connected to create a loop-back system. In computer room, one optical panel is employed to cascade the fiber links. Hence, the entire building becomes a distributed fiber-sensing network providing social sensing function and application.

Figures 4A, 4B:
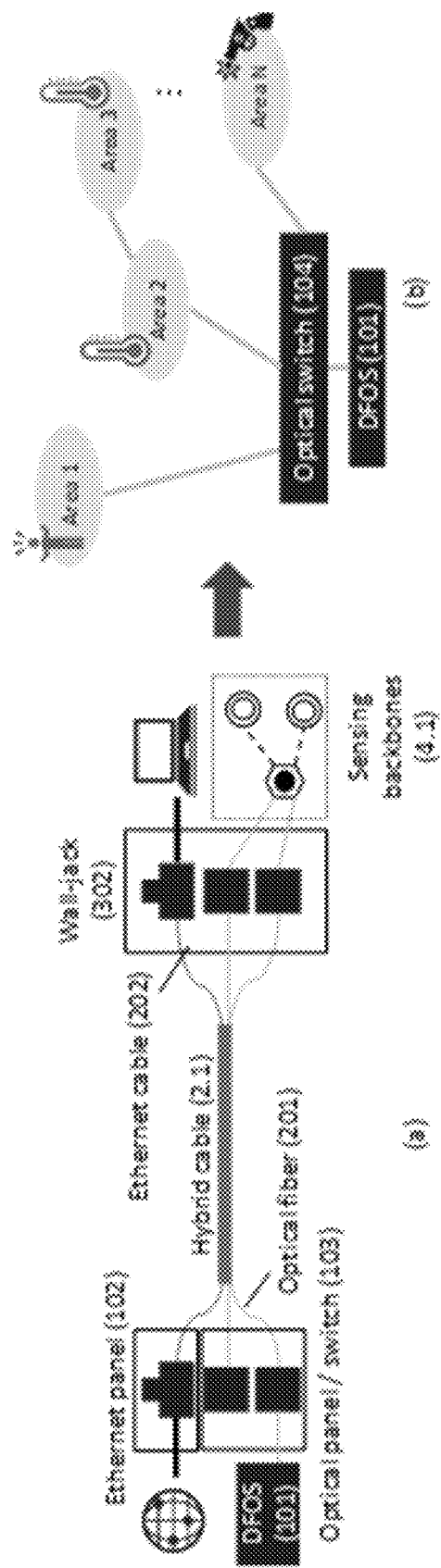
FIG. 4(A) and FIG. 4(B) are a schematic diagrams illustrating.

Another approach, employs an optical switch to selected routes for individual sensing applications. FIG. 4(A) and FIG. 4(B) are a schematic diagrams illustrating: FIG. 4(A) distributed sensing elements and FIG. 4(B) distributed sensing network in a tree topology according to aspects of the present disclosure. As shown there, every fiber port located on wall jack presents a sensing node. By using optical single mode fiber (SMF) to connect expanded locations, sensing backbones may be realized according to aspects of the present disclosure. Accordingly, disaster events such as earthquake, explosions, elevated temperatures, depressed temperatures, building health/integrity etc inside buildings is continuously monitored in real time by the distributed fiber optic sensing (DFOS) system early, such that damage/casualties/consequences may be reduced as compared with a later discovery. Table 1 provides a list of sensing technologies and applications.

TABLE 1

| SENSING TECHNOLOGY | APPLICATIONS |
| --- | --- |
| Distributed Acoustic Sensing (DAS) | Gunshot Detection |
| | Screams |
| | Structural Health |
| | Locating Events |
| Distributed Temperature Sensing (DTS) | Device Temperature |
| | Building Temperature |
| | Abnormal Temperature(s) |
| Optical Fiber Hybrid Cable | Future High Capacity Delivery |

At this point, while we have presented this disclosure using some specific examples, those skilled in the art will recognize that our teachings are not so limited. Accordingly, this disclosure should only be limited by the scope of the claims attached hereto.

The invention claimed is:

1. An integrated distributed fiber optic sensing system comprising:
   a length of a hybrid ethernet/optical fiber cable including one or more optical fiber cables and one or more ethernet cables;
   a distributed fiber optic sensing (DFOS) interrogator in optical communication with the one or more optical fiber cables;
   one or more computing systems in electrical communication with the one or more ethernet cables; and one or more optical switches in optical communication with the one or more optical fiber cables included in the length of hybrid cable.

2. The integrated system of claim 1 wherein the optical fiber cable comprises a length of duplex single mode fiber (SMF) cable, said duplex SMF cable including two, individual single mode optical fibers.

3. The integrated system of claim 1 wherein the DFOS provides acoustic/vibration signals monitoring.

4. The integrated system of claim 1 wherein the DFOS provides building/temperature monitoring.

5. The integrated system of claim 1 wherein the DFOS includes an optical switch interconnecting the interrogator to individual sensory areas via the one or more optical fiber cables in a tree topology.

6. The integrated system of claim 1 wherein the DFOS interrogator is interconnected to individual sensory areas via the one or more optical fiber cables in a distributed network.

* * * * *